2,2-DIMETHYLALKYL SULFATES AND SALTS THEREOF

Hugh J. Hagemeyer, Jr., Alden E. Blood, and James D. Heller, Longview, Tex., assignors to Eastman Kodak Company, Rochester, N.Y., a corporation of New Jersey
No Drawing. Filed Nov. 26, 1965, Ser. No. 510,059
5 Claims. (Cl. 260—459)

This application is a continuation-in-part of our copending application Ser. No. 237,352, filed Nov. 13, 1962, and now abandoned.

This invention relates to novel surface active agents. More particularly, the invention relates to 2,2-dimethylalkyl sulfates and their salts.

Water-soluble alkyl sulfate salts have been proposed for use as surface active agents. As a rule, straight chain alkyl sulfate salts have been more active than their branched-chain isomers. The present invention provides branched-chain alkyl sulfates having two methyl groups substituted at the 2-position on the alkyl chain and having the following general formula:

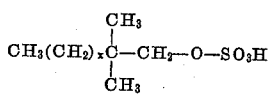

wherein $x$ is an integer from 1 to 17, and provides water soluble salts of these sulfates. Our invention is based on the discovery that these novel sulfate salts possess properties as surface active agents that make them markedly superior to the prior comparable alkyl sulfate salts in such respects as hydrolytic stability, solubility, biological degradation, detergency, wetting properties, foaming and foam stability, and surface active effectiveness at very low concentrations.

The 2,2-dimethylalkyl sulfates are prepared by sulfation of 2,2-dimethyl alkanols, which are known and can be prepared by any of several conventional processes. We prefer to make these alkanols by a telomerization reaction of an isobutyric acid ester, e.g. isobutyl isobutyrate, with ethylene at elevated pressure and temperature, for example 400 to 2000 p.s.i.g. and 100 to 300° C. in the presence of an organic peroxide catalyst such as cumene hydroperoxide. Units of ethylene are thus added to the starting ester to form telomer esters of 2,2-dimethylalkanoic acids containing, e.g. 6 or more carbon atoms. Such esters are then hydrogenated to produce the 2,2-dimethyl alkanols used in preparing the novel sulfates of the present invention.

Sulfation of the alkanols is by conventional methods. Several suitable methods are known which employ various sulfating agents such as sulfuric acid, chlorosulfonic acid, and sulfur trioxide. The salts of the sulfates are prepared by neutralization with a base such as ammonium hydroxide or an alkali metal hydroxide, or an amine such as triethanol amine. Sodium hydroxide, potassium hydroxide and lithium hydroxide are illustrative, but not limitative, of the alkali metal hydroxides that can be employed to prepare water-soluble salts of our invention. Although we prefer to employ the sodium salt of the sulfates, it is to be understood that all water-soluble salts of 2,2-dimethylalkyl sulfates containing at least 6 carbon atoms are within the scope of the present invention.

Following are examples of preferred methods for preparing dialkyl sulfates and sulfate salts according to the present invention.

EXAMPLE 1

*Preparation of sodium 2,2-dimethyloctyl sulfate*

Seventy-nine grams of 2,2-dimethyloctanol (95 ml., 0.50 mole) was dissolved in 200 g. of anhydrous ethyl ether and cooled to 0° C. in a 1000 ml. round-bottomed flask. To this was added slowly with stirring 228 g. (0.6 mole, 20% excess) of 21% fuming $H_2SO_4$. Stirring was then continued for one-half hour at a temperature of 10 to 15° C.

The product was poured into 500 g. of a mixture of ice and water. The acid neutralized with 30% sodium hydroxide solution using standard pH paper as indicator, and ether was removed as required by warming on a steam bath using a gentle stream of air on the surface. The solution was cooled and transferred to a 3-liter separatory funnel; 500 ml. of anhydrous isopropyl alcohol was added, and the whole was diluted to 1400 ml. with water. The mixture was extracted three times with 300 ml. portions of petroleum ether (B.P. 30–60° C.), and the ether extracts were combined and counter extracted once with 200 ml. of 33% isopropyl alcohol. The ether extracts were discarded and the aqueous-alcoholic extracts were combined and dehydrated with an excess of anhydrous sodium carbonate. The clear upper alcohol layer was evaporated to give sodium 2,2-dimethyloctyl sulfate. The yield was 93%.

EXAMPLE 2

*Preparation of sodium 2,2-dimethyldecyl sulfate*

The same procedure as given in Example 1 was followed using 93 g. of 2,2-dimethyl-decanol (0.50-mole, 111 ml.). The yield of sodium 2,2-dimethyldecyl sulfate was 89%.

EXAMPLE 3

*Preparation of sodium 2,2-dimethyldodecyl sulfate*

The same procedure as given in Example 1 was followed using 107 g. of 2,2-dimethyldodecanol (0.50 mole, 128 ml.), The yield of sodium 2,2-dimethyldodecyl sulfate was 95%.

EXAMPLE 4

*Preparation of sodium 2,2dimethyltetradecyl sulfate*

The same procedure used in Example 1 was followed using 121 g. of 2,2-dimethyltetradecanol (0.50 mole, 144 ml.). The yield of sodium 2,2-dimethyltetradecyl sulfate was 90%.

Similarly, 2,2-dimethylalkyl sulfates and their salts can be prepared from corresponding 2,2-dimethylalkanols containing 6–22 carbon atoms.

The 2,2-dimethylalkyl sulfate salts exhibit properties as surface active agents that are superior to properties of straight-chain and other branched-chain alkyl sulfate salts of comparable molecular weight. We believe these excellent properties are due to at least in part to the dimethyl substitution at the 2-position in the alkyl group.

Following are detailed comparisons of physical properties of 2,2-dimethylalkyl sulfate salts with those of other straight-chain and branched-chain alkyl sulfate salts of approximately equal molecular weights.

Surface tension

Surface tension was measured by ASTM Procedure D1131–156 using a du Nouy Tensiometer. Surface tension of water at 25° C. is 71.97 dynes/cm. Table 1 shows surface tension of dilute aqueous solutions of 2,2-dimethylalkyl sulfate sodium salts. Table 2 compares these properties with those obtained with known comparable surfactants. Concentrations in Tables 1 through 6 are shown as percent by weight.

TABLE 1.—SURFACE TENSIONS

[Dynes/cm. in distilled water at 25° C.]

| Sodium Sulfate Ester of— | Concentration (percent) | | | | |
|---|---|---|---|---|---|
| | 1.0 | 0.5 | 0.1 | 0.01 | 0.001 |
| 2,2-dimethylbutanol | 51 | 58 | | | |
| 2,2-dimethylhexanol | 39 | 44 | | | |
| 2,2-dimethyloctanol | 37 | 44 | 61 | 64 | 66 |
| 2,2-dimethyldecanol | 27 | 26 | 27 | 58 | 64 |
| 2,2-dimethyldodecanol | 33 | 33 | 36 | 56 | 63 |
| 2,2-dimethyltetradecanol | 30 | 28 | 34 | 54 | 61 |

TABLE 2.—COMPARATIVE SURFACE TENSIONS

[Dynes/cm. in distilled water at 25° C.]

| Sodium Sulfate Ester of— | Concentration (percent) | | |
|---|---|---|---|
| | 1.0 | 0.5 | 0.1 |
| 2,2-dimethylhexanol | 39 | 44 | |
| 2-ethylhexanol (Tergitol Anionic 08) | 44 | 49 | |
| 2,2-dimethyldecanol | 27 | 26 | 27 |
| Lauryl Alcohol (Duponol ME) | 31 | 32 | 31 |
| Tridecyl Alcohol | 31 | 31 | 44 |
| 2,2-dimethyldodecanol | 33 | 33 | 36 |
| 2-methyl-7-ethylundecanol-4 (Tergitol Anionic 4) | 31 | 36 | 47 |
| 2,2-dimethyltetradecanol | 30 | 25 | 25 |
| 3,9-diethyltridecanol-7 (Tergitol Anionic 7) | 28 | 28 | 34 |

The term "Tergitol" used in Table 2 is a trademark for surface active agents prepared from branched-chain alcohols. Lauryl alcohol is a mixture of straight-chain alcohols. Tridecyl alcohol is a mixture of tetramethylnonanols.

Wetting

The property called wetting is the ability to penetrate or wet fabrics easily. In general, the higher molecular weight homologues in sodium alkyl sulfate series have been better wetting agents. Wetting was measured by the Draves-Clarkson test using a three-gram hook, a 40-gram weight, and a standard 2-ply, 5-gram cotton skein. Wetting times for compounds within the scope of the invention are shown in Table 3. Wetting times for these compounds are compared with some commercially available branched-chain compounds in Table 4.

TABLE 3.—DRAVES-CLARKSON WETTING TIMES

[Distilled water at 25°C., time in seconds]

| Sodium Sulfate Ester of— | Concentration (percent) | | |
|---|---|---|---|
| | 0.5 | 0.1 | 0.025 |
| 2,2-dimethylbutanol | >180 | | |
| 2,2-dimethylhexanol | >180 | | |
| 2,2-dimethyloctanol | 138 | >180 | |
| 2,2-dimethyldecanol | 0 | 51 | >180 |
| 2,2-dimethyldodecanol | 0 | 5 | 54 |
| 2,2-dimethyltetradecanol | 0 | 0 | 10 |

TABLE 4.—COMPARATIVE DRAVES-CLARKSON WETTING TIMES

[Distilled water at 25°C., time in seconds]

| Sodium Sulfate Ester of— | Concentration (percent) | | |
|---|---|---|---|
| | 0.5 | 0.1 | 0.025 |
| 2,2-dimethylhexanol | >180 | | |
| 2-ethylhexanol (Tergitol Anionic 08) | >180 | | |
| 2,2-dimethyldodecanol | 0 | 5 | 54 |
| 2-methyl-7-ethylundecanol-4 (Tergitol Anionic 4) | 0 | 6 | 180 |
| 2,2-dimethyltetradecanol | 0 | 0 | 10 |
| 3,9-diethyltridecanol-7 (Tergitol Anionic 7) | 0 | 0 | 14 |
| (a) 1-methylpentadecyl sulfate | | | 25 |
| (b) 2-methyl-1-pentyl sulfate | | | >180 |
| (b) 2,4-dimethyl-1-hexyl sulfate | | | >180 |
| (b) 2,4-dimethyl-1-pentyl sulfate | | | >180 |
| (c) 1,1-dimethylpentadecyl sulfate | | | 30 |
| (d) 3,3-dimethylbutyl sulfate | | | >180 |
| (d) 3,3-dimethylhexyl sulfate | | | >180 |
| (e) 1-ethylbutyl sulfate | | | >180 |
| (e) 3,5,5-trimethylheptyl sulfate | | | >180 |
| (e) 1-methyldecyl sulfate | | | 160 |
| (e) 1-ethylnonyl sulfate | | | >180 |
| (e) 1-methyl-4-ethyl-octyl sulfate | | | >180 |
| (f) 3,5,5-trimethylhexyl sulfate | | | >180 |

(a)—Bertsch U.S. Patent 2,027,896.
(b)—Chambers U.S. Patent 2,079,788.
(c)—Guenther et al. U.S. Patent 2,229,649.
(d)—Wiese U.S. Patent 2,660,602.
(e)—Beilstein, Vol. 1, 3rd Supplement, pages 1733, 1756, 1774, 1775 and 1777, respectively (1958).
(f)—Bruner, Ind. and Eng. Chem., Vol. 41, pages 2860–2864 (1958).

Foaming power and foam stability

The 2,2-dimethylalkyl sulfate salts generally show better foaming properties than other alkyl sulfate salts. When foam is desired, usually it is necessary that the foam have good stability. Foam value was measured by the Ross-Miles Foam Test. Foam height was measured at zero minutes and after five minutes. The height at zero minutes is considered a measure of foaming power and the height remaining after five minutes indicates foam stability. Foam properties of some 2,2-dimethylalkyl sulfates are shown in Table 5. Foam power of the two highest molecular weight compounds listed in Table 5 is compared with the foaming power of commercial surfactants in an equivalent molecular weight range in Table 6.

Detergency

Detergency is the ability to remove soil. This property is measured by noting the increase in light reflectance from a soiled cloth after it has been laundered with the test surfactant by a standard method. A higher percentage

| 2,2-dimethyltetradecanol | 30 |
|---|---|
| Lauryl alcohol (av. M.W. $C_{15}$) | 28 |
| (a) 1-methylpentadecyl sulfate | 23 |
| (b) 2-methyl-1-pentyl sulfate | 0 |
| (b) 2,4-dimethyl-1-hexyl sulfate | 0 |
| (b) 2,4-dimethyl-1-pentyl sulfate | 0 |
| (c) 1,1-dimethylpentadecyl sulfate | 24 |
| (d) 3,3-dimethylbutyl sulfate | 0 |
| (d) 3,3-dimethylhexyl sulfate | 0 |
| (e) 1-ethylbutyl sulfate | 0 |
| (e) 3,5,5-trimethylheptyl sulfate | 0 |
| (e) 1-methyldecyl sulfate | 8 |
| (e) 1-ethylnonyl sulfate | 7 |
| (e) 1-methyl-4-ethyl-octyl sulfate | 7 |
| (f) 3,5,5-trimethylhexyl sulfate | 0 |

(a)—Bertsch U.S. Patent 2,027,896.
(b)—Chambers U.S. Patent 2,079,788.
(c)—Guenther et al. U.S. Patent 2,229,649.
(d)—Wiese U.S. Patent 2,660,602.
(e)—Beilstein, vol. 1. 3rd supplement, pages 1733, 1756, 1774, 1775 and 1777, respectively (1958).
(f)—Bruner, Ind. and Eng. Chem., vol. 41, pages 2860–2864 (1958).

TABLE 5.—ROSS-MILES FOAM VALUES IN DISTILLED WATER AT 120° F. AFTER 0 MINUTES AND AFTER 5 MINUTES
[Height in Millimeters]

| Sodium Sulfate Ester of— | Concentration (percent) | | | | | |
|---|---|---|---|---|---|---|
| | 1.0 | | 0.05 | | 0.01 | |
| | 0 Min. | 5 Min. | 0 Min. | 5 Min. | 0 Min. | 5 Min. |
| 2,2-dimethylbutanol | 15 | 0 | | | | |
| 2,2-dimethylhexanol | 35 | 10 | | | | |
| 2,2-dimethyloctanol | 150 | 90 | 10 | 0 | | |
| 2,2-dimethyldecanol | 195 | 50 | 30 | 0 | | |
| 2,2-dimethyldodecanol | 165 | 150 | 130 | 40 | 10 | 0 |
| 2,2-dimethyltetradecanol | 190 | 190 | 140 | 140 | 80 | 70 |

TABLE 6.—COMPARATIVE ROSS-MILES FOAM VALUES
[Conditions same as in Table 5]

| Sodium Sulfate Ester of— | Concentration (percent) | | | |
|---|---|---|---|---|
| | 0.1 | | 0.05 | |
| | 0 Min. | 5 Min. | 0 Min. | 5 Min. |
| 2,2-dimethyldodecanol | 140 | 80 | 130 | 40 |
| Tridecanol | 205 | 205 | 85 | 0 |
| 2-methyl-7-ethylundecanol-4 (Tergitol Anionic 4) | 3 | 0 | | |
| 2,2-dimethyltetradecanol | 150 | 150 | 140 | 140 |
| 3,9-diethyltridecanol-7 (Tergitol Anionic 7) | 108 | 12 | | | increase in reflectance indicates higher detergency. Generally, a higher molecular weight soluble homologue in a sodium alkyl sulfate series will have better detergency than the lower homologues. Detergency values were determined using a "Terg-o-tometer" with water of zero hardness at 140° F. The washing was carried out at 100 cycles per minute with U.S. Testing Company Soiled Cotton Cloth. Detergent concentration in the wash water was 0.5% of a formula containing 25% test surfactant, 45% sodium triphosphate, 10% tetrasodium pyrophosphate, 10% sodium metasilicate, 9% sodium sulfate, and 1% sodium carboxymethylcellulose. Detergency of several 2,2-dimethylalkyl sulfate salts and some comparable commercial detergents are reported in Table 7.

TABLE 7.—DETERGENCY

| Sodium sulfate ester of: | Average increase in reflectance, percent |
|---|---|
| 2,2-dimethyloctanol | 10 |
| 2,2-dimethyldecanol | 12 |
| 2,2-dimethyldodecanol | 24 |
| Tridecanol | 15 |

Solubility

The sodium 2,2-dimethylalkyl sulfates are without exception more soluble than other alkyl sulfate salts of comparable molecular weight. This is shown in Table 8 which shows solubility in grams of detergent per 100 ml. water. In molecular weights higher than $C_{14}$ the difference in solubility is quite large. This is an advantage in preparing concentrated clear solutions without need to use alcohol or more expensive ammonium salts.

TABLE 8.—COMPARATIVE SOLUBILITIES
[25° C. in distilled water]

| Sodium sulfate ester of: | Grams/100 ml. of solution |
|---|---|
| 2,2 - dimethylbutanol | >60 |
| 2,2 - dimethylhexanol | >45 |
| 2,2 - dimethyloctanol | 36 |
| 2,2 - dimethyldecanol | 30 |
| n - Dodecanol | 28.8 |
| n - Dodecanol | 11 |
| 1 - methyldecanol | 25 |
| 2,2 - dimethyldodecanol | 13.5 |

TABLE 8—Continued

| | |
|---|---|
| n - Tetradecanol | 0.24 |
| 1 - methyldodecanol | 4.2 |
| 2,2 - dimethyltetradecanol | 10.0 |
| n - Hexadecanol | 0.01 |
| 1 - methyltetradecanol | 0.24 |
| 1 - methylhexadecanol | 0.01 |

Hydrolytic stability

Because of hindrance caused by 2,2-dimethyl substitution, the 2,2-dimethylalkyl sulfate salts possess greater hydrolytic stability than other alkyl sulfates of comparable molecular weight. For example, 2% water solutions of sodium 2-ethylhexyl sulfate and sodium 2,2-dimethylhexyl sulfate were refluxed for 16 hours. The sodium 2-ethylhexyl sulfate was 41% hydrolyzed while the sodium 2,2-dimethylhexyl sulfate was less than 2% hydrolyzed after the same period.

Biological degradation 2,2-dimethylalkyl sulfate salts are easily degradable by biological oxidation to sodium neopentyl sulfate, a material that is quite water soluble and is not a surfactant. This degraded product will not cause foaming in sewers.

The invention has been described with reference to certain preferred embodiments, but it will be understood that variations and modifications of the invention as described can be made within the scope of the invention as defined in the following claims.

We claim:
1. A 2,2-dimethylalkyl sulfate having the formula:

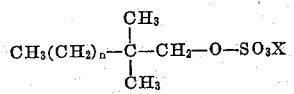

wherein $n$ is a whole number from 1 to 17 and X is a member selected from the group consisting of hydrogen, an alkali metal, ammonium and triethanolamino.

2. A compound in accordance with claim 1 wherein X is hydrogen.
3. A compound in accordance with claim 1 wherein X is sodium.
4. A compound in accordance with claim 1 wherein X is ammonium.
5. A compound in accordance with claim 1 wherein X is triethanolamino.

References Cited

UNITED STATES PATENTS

| | | | |
|---|---|---|---|
| 2,052,027 | 8/1936 | Harris | 260—459 |
| 2,079,788 | 5/1937 | Chambers | 260—459 X |
| 2,660,602 | 11/1953 | Wiese | 260—460 |

OTHER REFERENCES

Feigl et al.: Chemist-Analyst, vol. 49, pp. 13–14 (1954).

CHARLES B. PARKER, *Primary Examiner.*

JOSEPH P. BRUST, *Examiner.*

F. D. HIGEL, *Assistant Examiner.*